(12) United States Patent
Dimitri et al.

(10) Patent No.: US 8,108,283 B2
(45) Date of Patent: Jan. 31, 2012

(54) SYNTHETIC CURRENCY

(75) Inventors: Edoardo Dimitri, London (GB);
Filippos Kasimatis, London (GB);
Andrew Kaufmann, London (GB)

(73) Assignee: Barclays Bank PLC, London (GB)

( * ) Notice: Subject to any disclaimer, the term of this patent is extended or adjusted under 35 U.S.C. 154(b) by 182 days.

(21) Appl. No.: 11/715,093

(22) Filed: Mar. 7, 2007

(65) Prior Publication Data

US 2008/0222051 A1 Sep. 11, 2008

(51) Int. Cl.
*G06Q 40/00* (2006.01)
(52) U.S. Cl. ........................... 705/36 R; 705/35
(58) Field of Classification Search ............ 705/35, 705/36 R
See application file for complete search history.

(56) References Cited

U.S. PATENT DOCUMENTS

| | | | |
|---|---|---|---|
| 6,188,993 B1 * | 2/2001 | Eng et al. | 705/37 |
| 2002/0002538 A1 * | 1/2002 | Ling | 705/41 |
| 2004/0205012 A1 * | 10/2004 | O'Connor | 705/36 |
| 2005/0171894 A1 * | 8/2005 | Traynor | 705/37 |
| 2006/0155638 A1 * | 7/2006 | de la Motte | 705/37 |

* cited by examiner

*Primary Examiner* — Lindsay M. Maguire
(74) *Attorney, Agent, or Firm* — Amster, Rothstein & Ebenstein LLP

(57) ABSTRACT

A method for formulating a synthetic currency including the steps of borrowing an amount of funds in at least one first currency at a first interest rate, converting a portion of the borrowed funds to at least one second currency, investing the portion of the borrowed funds in an investment that pays interest which covers at least a portion of cost of borrowing the borrowed funds in the first currency, and providing a third currency based on the remaining portion of the borrowed funds.

18 Claims, 3 Drawing Sheets

SYNTHETIC CURRENCY

FIELD OF THE INVENTION

The present invention relates to systems and methods for generating synthetic currency.

BACKGROUND OF THE INVENTION

Currency may be defined as a unit of exchange, facilitating the transfer of goods and services. It is a form of money, where money is an efficient medium of exchange, and may also be considered as a store of value, created through a claim to a central bank, agency or government.

A synthetic currency is a unit of measure of economic value that is not backed by any central government, any central agency or any central bank (hence the use of the term "synthetic"). The value of a synthetic currency can be defined as a function of the value of other assets (e.g., other currencies). A synthetic currency can have a set of additional measures that help define its characteristics, such as an interest rate that describes how much it costs/returns to borrow/invest the currency from/with third parties.

Synthetic currency may serve many purposes. For example, a country may peg its currency to the U.S. dollar (or euro, etc.) but, for political, cultural, social or other reasons, would prefer to peg to a basket of currencies or a synthetic currency that does not contain the dollar but whose value could move with the dollar over time. Synthetic currency may also be used by large firms (whether public or private) and national governments to issue global bonds or other securities for their own financing purposes, so as to cater to investors' nationalistic, investment or political preferences. Also, synthetic currencies may be used to study currency movements. A synthetic currency may also be used in any economic transaction to the extent that it provides a unit of measure that facilitates such transactions.

Additionally, as the size and popularity of foreign exchange markets have grown, investors have formulated strategies for maximizing yield in these markets. One such strategy exploits extended periods of exchange rate appreciation by higher yielding currencies, known as "forward bias", by investing in these high-yielding currencies. A popular form of this investment strategy is the carry trade, in which an investor takes a short position by borrowing in a low-interest rate currency, such as the U.S. dollar, and then takes a long position in a higher interest rate currency, such as the Australian dollar. With a carry trade, an investor essentially bets that the exchange rate will not change so as to offset the interest rate differential.

Accordingly, there is a need for a system and method for generating synthetic currency that takes advantage of the benefits offered by the carry trade strategies.

SUMMARY OF THE INVENTION

A method for formulating a synthetic currency according to an exemplary embodiment of the present invention comprises the steps of borrowing an amount of funds in at least one first currency at a first interest rate, converting a portion of the borrowed funds to at least one second currency, investing the portion of the borrowed funds in an investment that pays interest which covers at least a portion of cost of borrowing the borrowed funds in the first currency, and providing a third currency based on the remaining portion of the borrowed funds.

In at least one embodiment, risk associated with the third currency is related to changes in exchange rates of the first and second currencies.

In at least one embodiment, the step of investing comprises investing in derivative contracts.

In at least one embodiment, the step of investing comprises lending the portion of the borrowed funds.

In at least one embodiment, the investment pays interest which covers the cost of borrowing plus a fee.

In at least one embodiment, the at least one first currency comprises a plurality of currencies.

In at least one embodiment, the at least one second currency comprises a plurality of currencies.

In at least one embodiment, the step of investing comprises investing the portion of the borrowed funds in an investment that pays interest which covers at least the total cost of borrowing the borrowed funds.

In at least one embodiment, the step of providing a third currency based on the remaining portion of the borrowed funds comprises providing the third currency at zero percent interest rate.

In at least one embodiment, the step of providing a third currency based on the remaining portion of the borrowed funds comprises providing the third currency at a positive interest rate.

In at least one embodiment, the step of investing comprises investing the portion of the borrows funds in an investment that pays interest which covers less than the total cost of borrowing the funds.

In at least one embodiment, the step of providing a third currency based on the remaining portion of the borrowed funds comprises providing the third currency at a negative interest rate.

A method of loaning synthetic currency according to an exemplary embodiment of the present invention comprises loaning the synthetic currency at an interest rate that generates a profit, the synthetic currency being generated by the steps of borrowing an amount of funds in at least one first currency at a first interest rate, converting a portion of the borrowed funds to at least one second currency, investing the portion of the borrowed funds in an investment that pays interest which covers at least a portion of cost of borrowing the borrowed funds in the first currency, and providing a third currency based on the remaining portion of the borrowed funds.

In at least one embodiment, the method of loaning comprises loaning the synthetic currency with a fee that generates a profit.

According to an exemplary embodiment of the present invention, a computer readable medium has computer executable instructions for performing a method for generating synthetic currency, the method comprising the steps of borrowing an amount of funds in at least one first currency at a first interest rate, converting a portion of the borrowed funds to at least one second currency, investing the portion of the borrowed funds in an investment that pays interest which covers at least a portion of cost of borrowing the borrowed funds in the first currency; and providing a third currency based on the remaining portion of the borrowed funds.

A system for formulating synthetic currency according to an exemplary embodiment of the present invention comprises an investment amount calculator that determines an amount of borrowed funds in at least one first currency at a first interest rate to be converted to at least one second currency and invested in an investment that pays interest which covers at least a portion of cost of borrowing the borrowed funds in the first currency, and a synthetic currency generator that provides a third currency based on the remaining portion of the borrowed funds.

These and other features of this invention are described in, or are apparent from, the following detailed description of various exemplary embodiments of this invention.

BRIEF DESCRIPTION OF THE DRAWINGS

Various exemplary embodiments of this invention will be described in detail, with reference to the following figures, wherein.

DETAILED DESCRIPTION OF PREFERRED EMBODIMENTS

Various exemplary embodiments of the present invention are related to a system and method for generating synthetic currency that use the benefits of carry trading. In particular, the systems and methods of the present invention generate synthetic currency by borrowing in low-interest currency and investing in high-interest currency. As explained in further detail below, the systems and methods of the present invention may be implemented via a computer as programming instructions available on computer software and/or hardware and executable on a computer processor.

Figure 1:
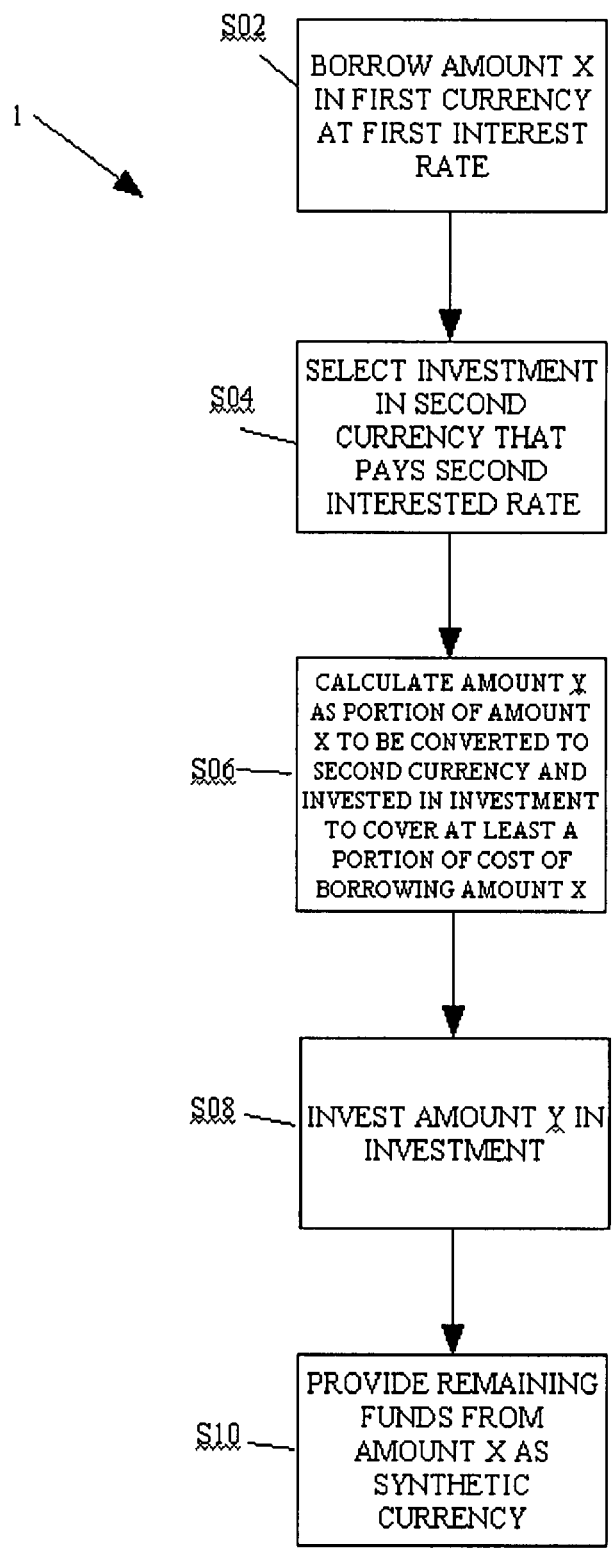
FIG. 1 is a flowchart showing a method of generating synthetic currency according to an exemplary embodiment of the present invention.

FIG. 1 is a flowchart showing a method, generally designated by reference number 1, of generating synthetic currency according to an exemplary embodiment of the present invention. In step S02 of the method 1, an amount X is borrowed in a first currency at a first interest rate. In step S04, an investment in a second currency is chosen, in which the investment pays a second interest rate which is preferably higher than the first interest rate. The investment may be any suitable investment that provides a higher interest rate than the first interest rate, such as, for example, a loan, a fund, derivative contracts, a certificate of deposit, or interest earned from depositing in a savings account. Additionally, there can be other suitable investments whose value is linked to the difference in value and in interest rate between two or more assets, such as foreign exchange swaps or other suitable derivatives. Further, the synthetic currency may be used to formulate a variety of financial products, such as, for example, a fund, a note, a security, an over-the-counter (OTC) product or a debt instrument.

In step S06, an amount Y is calculated, which represents an appropriate portion of the amount X which needs to be converted to the second currency and invested in the investment that pays at the second interest rate, so that the invested amount Y covers at least a portion of the cost associated with borrowing the amount X. According to an exemplary embodiment of the present invention, the invested amount Y covers the total cost associated with borrowing the amount X. In this case, the amount Y may be calculated using equation (1) as shown below:

$$Y = \frac{(X)(FirstInterestRate)}{(SecondInterestRate)}.$$

where,
Y=portion of amount X to be converted to second currency and invested.
X=amount borrowed in the first currency.
First Interest Rate=interest rate associated with borrowing the amount X.
Second Interest Rate=interest rate associated with investing the amount Y.

In step S08, the amount Y is invested in the investment. In step S10, the remaining funds from the amount X are made available as synthetic currency. The synthetic currency may then be loaned at 0% interest, or a positive interest rate to realize an overall profit in generating the synthetic currency. Alternatively, the interest rate charged for loaning the synthetic currency may be determined so as to at least cover any differential between the profit earned from investing the amount Y and the cost associated with borrowing the amount X. In other exemplary embodiments of the invention, the synthetic currency may be made available at a negative interest rate. In this regard, the synthetic currency value over time may be determined as follows: the original value of the synthetic currency minus a) cost of interest (which may be arbitrary and thus may be positive or negative) plus b) cost of borrowing in one or more currencies minus c) interest received by investing in one or more currencies plus d) change in market value of the currencies borrowed and the currencies invested plus e) fees. Preferably, the issuer of synthetic currency would charge a low synthetic currency interest (or possibly a negative interest rate, in which case the borrower actually receives money for borrowing), with the ultimate goal being that the interest received from investment plus the interest charged on the synthetic currency is greater than or equal to the interest cost on the borrowed amounts.

Since the synthetic currency of the present invention is based on the carry trade strategy, it may be made available for borrowing purposes at a relatively low interest rate and with little volatility. In this regard, historical data regarding the one or more currencies which make up the synthetic currency and a target volatility for the synthetic currency may be analyzed on a periodic basis to generate an optimal portfolio of one or more currencies borrowed and invested that provides excess returns at the target volatility. The historical data regarding the one or more currencies may include data regarding, for example, the performance of investments using the one or more borrowed currencies, the fluctuation in currency interest rates, and exchange rates between currencies. The issuer of the synthetic currency may adjust the amount borrowed in the one or more currencies on a periodic basis, such as, for example, on a weekly, monthly, or semi-annual basis, to maintain the synthetic currency at a steady state so that the issuer may offer the synthetic currency at a low interest rate with little volatility.

Figure 2:
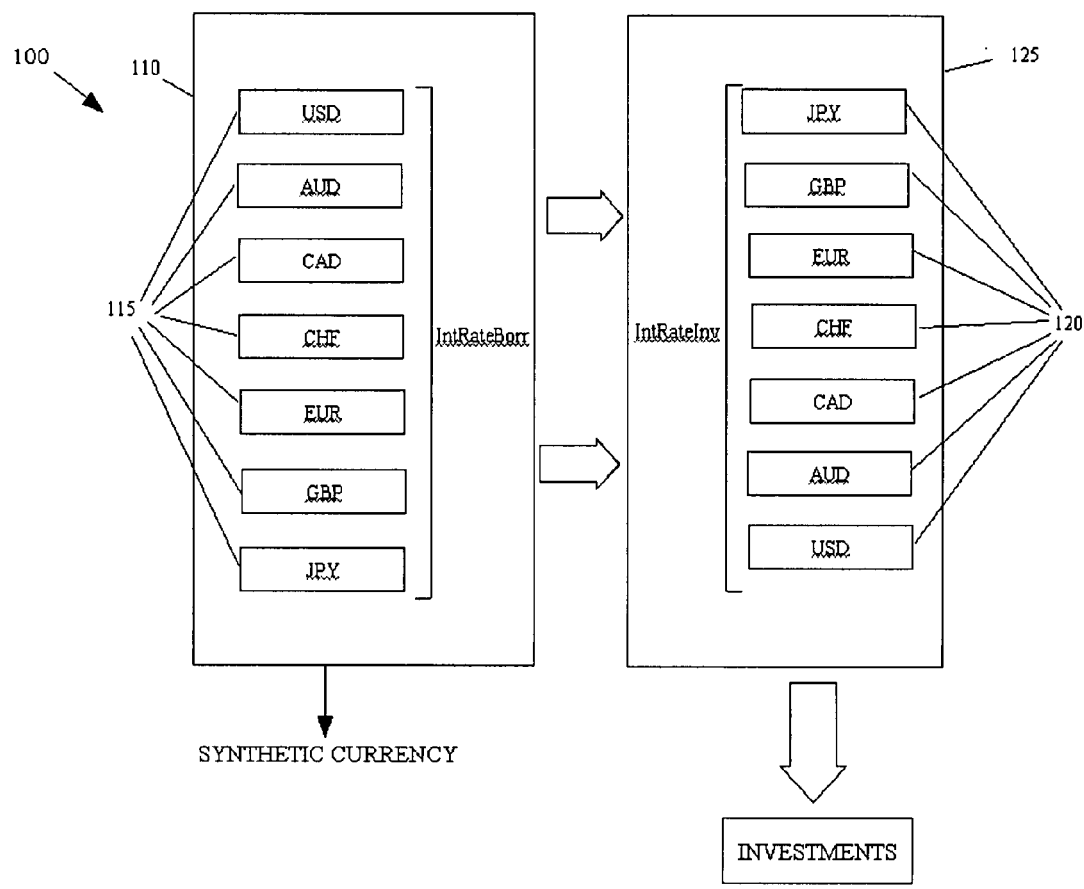
FIG. 2 is a block diagram showing a method of generating synthetic currency according to another exemplary embodiment of the present invention.

In exemplary embodiments of the present invention, synthetic currency may be generated by borrowing funds in a variety of currencies, and then converting at least a portion of the borrowed funds to a variety of other currencies and investing the converted funds in a variety of investments to at least cover the cost of borrowing the funds. For example, as shown in FIG. 2, which is a block diagram showing a method of generating synthetic currency, generally designated by reference number 100, according to an exemplary embodiment of the present invention, a block 110 of first funds 115 in a variety of first currencies may be borrowed. The first currencies may be, for example, the U.S. dollar (USD), Australian dollar (AUD), Canadian dollar (CAD), Swiss franc (CHF), European euro (EUR), British pound (GBP) and Japanese yen (JPY). Of course, other currencies could also be used as appropriate. Each of the first funds 115 has a corresponding interest rate depending on the type of currency of each fund 115. However, a total interest rate for borrowing the block of first funds, represented as IntRateBorr in FIG. 2, may be calculated based on each of the interest rates of the first funds 115. A portion or all of each first fund 115 may then be converted to a second fund 120, each second fund 120 being in a variety of second currencies, resulting in a block 125 of second funds 120. Each of the second funds 120 may then be invested in an investment that pays an interest rate that covers a portion, the total amount or more than the total amount of the cost of borrowing a corresponding first fund 115. Each investment has a corresponding interest rate yield. However, a total interest rate earned from the investments, represented as InRateInv in FIG. 2, may be calculated based on each of the interest rates earned by the second funds 120, so that it may be determined whether the total of investments of the second funds 120 would cover the cost of borrowing the first funds 115. The total amount remaining from the first funds 115 or any additional interest earned in excess of the borrowing interest cost may then be made available as synthetic currency. Also, the changes in value of the first funds 115 and the changes in value of the second funds 120 may be made available as synthetic currency.

Figure 3:
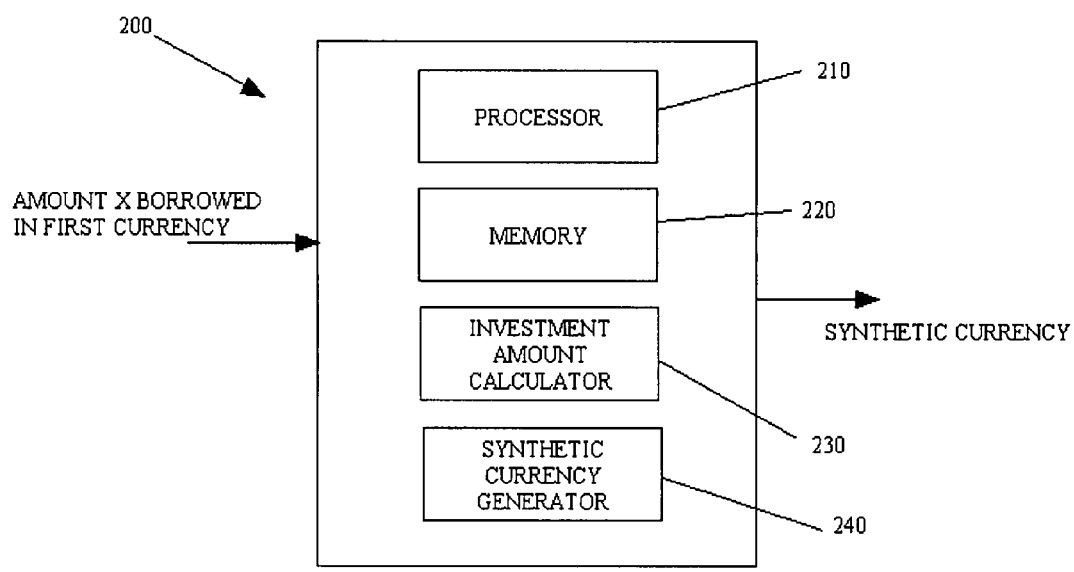
FIG. 3 is a block diagram of a system for generating synthetic currency according to an exemplary embodiment of the present invention.

FIG. 3 is a block diagram showing a system for generating synthetic currency, generally designated by reference number 200, according to an exemplary embodiment of the present invention. The system 200 includes a processor 210, a memory unit 220, an investment amount calculator 230 and a synthetic currency generator 240. The investment amount calculator 220 and synthetic currency generator 240 may be composed of software components running on the processor 210, a plurality of separate hardware components or a single hardware component, or a combination of hardware and software components.

The investment amount calculator 230 takes as input an amount X borrowed in the first currency, and calculates an amount Y from the amount X to be converted to a second currency and invested. For example, the investment amount calculator 230 may use Equation (1) to calculate the amount Y. As explained above, the investment in the amount Y preferably covers at least a portion of the cost of borrowing the amount X. The synthetic currency generator 240 generates synthetic currency based on the funds remaining from the amount X.

In various exemplary embodiments of the present invention, shares of the generated synthetic currency may be encoded into an electronic currency medium. Such encoding may require additional steps, such as authenticating and encrypting of the synthetic currency shares. The electronic currency medium may be, for example, e-cash or electronic smart cards.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A method comprising:
borrowing a first amount of funds in at least one first currency at at least one first interest rate;
converting using an investment amount calculator a portion of the borrowed funds to at least one second currency;
investing the portion of the borrowed funds in an investment made in the at least one second currency that pays interest at at least one second interest rate which covers at least a portion of cost of borrowing the borrowed funds in the first currency;
calculating using a synthetic currency generator a third currency as a synthetic currency that pays interest at a third interest rate, wherein a value of the third currency is a function of an original value of the synthetic currency, the third interest rate, a value of the first amount of funds, the at least one first interest rate, the value of the portion of the borrowed funds, the at least one second interest rate, and a remaining portion of the borrowed funds, wherein a value of the investment plus the value of the third currency is greater than or equal to a cost of borrowing so as to result in a guaranteed rate of return; and
making available the synthetic currency to one or more counterparties in one or more transactions at the third interest rate.

2. The method of claim 1, wherein the value of the synthetic currency is further a function of changes in exchange rates of the first and second currencies.

3. The method of claim 1, wherein the step of investing comprises investing in derivative contracts.

4. The method of claim 1, wherein the step of investing comprises lending the portion of the borrowed funds.

5. The method of claim 1, wherein the investment pays interest which covers the cost of borrowing plus a fee.

6. The method of claim 1, wherein the at least one first currency comprises a plurality of currencies.

7. The method of claim 1, wherein the at least one second currency comprises a plurality of currencies.

8. The method of claim 1, wherein the step of investing comprises investing the portion of the borrowed funds in an investment that pays interest which covers at least the total cost of borrowing the borrowed funds.

9. The method of claim 8, wherein the third interest rate is zero percent.

10. The method of claim 8, wherein the third interest rate is a positive interest rate.

11. The method of claim 1, wherein the step of investing comprises investing the portion of the borrowed funds in an investment that pays interest which covers less than the total cost of borrowing the funds.

12. The method of claim 11, wherein the third interest rate is a negative interest rate.

13. The method of claim 1, wherein the third currency is e-cash.

14. The method of claim 1, wherein the third currency is an electronic smart card.

15. The method of claim 1, further comprising:
loaning the synthetic currency at an interest rate that generates a profit.

16. The method of claim 1, further comprising:
loaning the synthetic currency with a fee that generates a profit.

17. A system, comprising:
memory operable to store at least one program; and
at least one processor communicatively coupled to the memory, in which the at least one program, when executed by the at least one processor, causes the at least one processor to:
- access and process data regarding a first amount of funds borrowed in at least one first currency at at least one first interest rate;
- convert using an investment amount calculator a portion of the borrowed funds to at least one second currency;
- access and process data regarding the portion of the borrowed funds as invested in an investment made in the at least one second currency that pays interest at at least one second interest rate which covers at least a portion of cost of borrowing the borrowed funds in the first currency;
- calculate using a synthetic currency generator a third currency as a synthetic currency that pays interest at a third interest rate, wherein a value of the third currency is a function of an original value of the synthetic currency, the third interest rate, a value of the first amount of funds, the at least one first interest rate, the value of the portion of the borrowed funds, the at least one second interest rate, and a remaining portion of the borrowed funds, wherein a value of the investment plus the value of the third currency is greater than or equal to a cost of borrowing so as to result in a guaranteed rate of return; and
- electronically make available the synthetic currency to one or more counterparties in one or more transactions at the third interest rate.

18. A system, comprising:
at least one processor readable medium operatively connected to at least one processor, the at least one processor readable medium having processor readable instructions executable by the at least one processor, wherein said at least one processor readable medium has stored thereon:
- (i) borrowed funds data associated with a first amount of funds borrowed in at least one first currency at at least one first interest rate,
- (ii) invested funds data associated with a portion of the borrowed funds converted using an investment amount calculator to at least one second currency,
- (iii) second interest rate data associated with at least one second interest rate, and
- (iv) remaining funds data associated with a remaining portion of the borrowed funds;

a synthetic currency generator that calculates using the at least one processor a third currency as a synthetic currency that pays interest at a third interest rate, wherein a value of the synthetic currency is a function of: (i) an original value of the synthetic currency, (ii) the third interest rate, (iii) a value of the first amount of funds, (iv) the at least one first interest rate, (v) the invested funds data, (vi) the second interest rate data, and (vii) the remaining funds data, and that makes available the value of the synthetic currency, wherein a value of the investment plus the value of the third currency is greater than or equal to a cost of borrowing so as to result in a guaranteed rate of return.

* * * * *